(12) United States Patent
Kang (10) Patent No.: US 9,696,001 B2
(45) Date of Patent: Jul. 4, 2017

(54) PATTERN MODULE FOR AUTOMOBILE LAMP AND METHOD FOR MANUFACTURING OF OPTICAL SHEET THEREOF

(71) Applicant: HYUNDAI MOBIS CO., LTD., Seoul (KR)

(72) Inventor: Dong Gon Kang, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 254 days.

(21) Appl. No.: 14/483,051

(22) Filed: Sep. 10, 2014

(65) Prior Publication Data
US 2015/0377441 A1 Dec. 31, 2015

(30) Foreign Application Priority Data

Jun. 26, 2014 (KR) .................. 10-2014-0079095

(51) Int. Cl.
*F21V 9/00* (2015.01)
*F21S 8/10* (2006.01)
*G02B 3/00* (2006.01)

(52) U.S. Cl.
CPC ......... *F21S 48/215* (2013.01); *F21S 48/2212* (2013.01); *F21S 48/234* (2013.01); *G02B 3/005* (2013.01)

(58) Field of Classification Search
CPC ...... F21S 48/215; F21S 48/22; F21S 48/2212; F21S 48/2231; F21S 48/2237; F21S 48/225; G02B 3/005
USPC .......................................... 362/602, 619–620
See application file for complete search history.

(56) References Cited

U.S. PATENT DOCUMENTS

| | | | |
|---|---|---|---|
| 2006/0126186 A1* | 6/2006 | Kanda ................... | G02B 3/005 359/622 |
| 2008/0013333 A1* | 1/2008 | Koizumi ............. | B60Q 1/2696 362/511 |

FOREIGN PATENT DOCUMENTS

| | | |
|---|---|---|
| KR | 2006-0096198 A | 9/2006 |
| KR | 2006-0118949 A | 11/2006 |
| KR | 2008-0079839 A | 9/2008 |
| KR | 2014-0021480 A | 2/2014 |

* cited by examiner

*Primary Examiner* — Jason Moon Han (57) ABSTRACT

An exemplary embodiment of the present invention provides a pattern module for an automobile lamp including: a substrate; a reflective sheet which is provided on the substrate and performs regular reflection; an optical sheet provided on the reflective sheet; an optical synthetic resin which is provided on the optical sheet and guides the light; and a light source which is provided on the substrate.

11 Claims, 7 Drawing Sheets

PATTERN MODULE FOR AUTOMOBILE LAMP AND METHOD FOR MANUFACTURING OF OPTICAL SHEET THEREOF

CROSS-REFERENCE TO RELATED APPLICATIONS

This application claims priority to and the benefit of Korean Patent Application No. 10-2014-0079095 filed in the Korean Intellectual Property Office on Jun. 26, 2014, the entire contents of which are incorporated herein by reference.

TECHNICAL FIELD

The present invention relates to a pattern module for an automobile lamp which implements various lamp light patterns having a three-dimensional effect and a manufacturing method of an optical sheet thereof.

BACKGROUND ART

Generally, a lighting system is provided in a vehicle as means for lighting during nighttime driving and means for various signals during driving. Among lighting systems of the vehicle which are installed for this purpose, rear lamps which are mounted at both rear edges of a vehicle body are components in which a brake light, a taillight, and a turn signal are combined and used to notify a driver who drives another vehicle at the behind of a driving direction and a status of its own vehicle. Generally, a real lamp includes a lamp housing which configures an overall rear framework, a reflector which is attached to a front side of the lamp housing to reflect light, a light source which is mounted on a front surface of the reflector, and a lens which is provided in front of the light source and the reflector. The rear lamp of the vehicle is improved from a point type light source to a linear type light source, and in recent years, is improved to a light source which shows surface type emission.

However, in accordance with a trend of the improvement of a design for a vehicle, even though the lamp is improved to the surface light source type, the surface light source has a low optical efficiency so that a manufacturing cost for components is relatively high and there is a technical problem in that the design is insufficient for three-dimensional effect.

SUMMARY OF THE INVENTION

The present invention has been made in an effort to provide a pattern module for an automobile lamp which implements various lamp light patterns having a three-dimensional effect and a manufacturing method of an optical sheet thereof.

An exemplary embodiment of the present invention provides a pattern module for an automobile lamp including: a substrate; a reflective sheet which is provided on the substrate and performs regular reflection; an optical sheet provided on the reflective sheet; an optical synthetic resin which is provided on the optical sheet and guides the light; and a light source which is provided on the substrate.

The light source may be an LED.

The light source may be a side view LED.

A plurality of light sources may be arranged on the substrate.

The optical sheet may include a lenticular lens.

The optical synthetic resin may be any one selected from resin, acryl, and silicon.

An upper synthetic resin may be provided on the optical synthetic resin.

The upper synthetic resin may be a PET.

The lenticular lens may have a shape in which a plurality of column-shaped lenses having any one shape selected from a semicircle, a semi ellipse, and a triangle is arranged.

The lenticular lens may be configured such that lenses which form the lenticular lens are arranged so as to be horizontal with an arrangement line on which the light sources are provided.

The lenticular lens may be configured such that lenses which form the lenticular lens are arranged so as to be inclined with respect to an arrangement line on which the light sources are provided.

The lenticular lens may be configured such that lenses which configure the lenticular lens are arranged so as to be inclined with respect to an arrangement line on which the light sources are provided and one ends of both ends of the lenses are arranged with an interval between the lenses.

The substrate may be a PCB.

Another exemplary embodiment of the present invention provides a manufacturing method of an optical sheet of a pattern module for an automobile lamp, including: a first step of applying an exposure solution on a specimen on which a pattern is formed; a second step of manufacturing a mask having a size of the lens; a third step of disposing the mask above the specimen on which the exposure solution is applied and then exposing the mask to ultraviolet ray to etch a portion excluding the mask to form an uneven pattern on a surface of the specimen; and a fourth step of manufacturing a pattern having a shape of the lenticular lens having an uneven pattern by applying heat on the specimen on which the uneven pattern is formed through the third step.

The uneven pattern of the third step may have a rectangular column shape and the uneven pattern after heat treatment in the fourth step may have a semicylindrical shape.

The method may further include, after the fourth step, a fifth step of depositing copper on the surface of the pattern; a sixth step of plating with nickel on the deposited copper; and a seventh step of manufacturing a lens array having an inversed shape to the pattern by removing the pattern.

Further, the method may further include, after the seventh step, an eighth step of mounting a lens array on one of a pair of left and right rollers which are disposed to be opposite to each other and a synthetic resin sheet on the other roller and then rotating the pair of left and right rollers to form a lenticular lens on the synthetic resin sheet and applying a resin on an optical sheet, on which the lenticular lens is formed and which passes between the left and right rollers and curing the resin which is applied on the optical sheet with an ultraviolet lamp.

According to the pattern module for an automobile lamp and the manufacturing method of an optical sheet thereof according to the exemplary embodiments of the present invention, various lamp light patterns having three-dimensional effect may be implemented.

Further, a lamp optical image having a 3D image shape with a linear pattern may be implemented.

Further, a line shaped lamp light image which forms a specific angle with a light source may be implemented.

Further, a curved pattern lamp light image may be implemented.

DETAILED DESCRIPTION OF THE INVENTION

Hereinafter, exemplary embodiments of the present invention will be described in detail with reference to the accompanying drawings. In the figures, it should be noted that even though the parts are illustrated in different drawings, it should be understood that like reference numerals refer to like parts of the present invention throughout the several figures of the drawing. Furthermore, hereinafter, exemplary embodiments of the present invention will be described. However, it should be understood that the technical spirit of the invention is not limited to the specific embodiments, but may be changed or modified in various ways by those skilled in the art.

An automobile lamp is developed to a surface light source type in accordance with a trend of development of a vehicle design. However, a surface light source of an automobile lamp of the related art has a low optical efficiency so that a manufacturing cost for components is relatively high and a three-dimensional effect is insufficient. Therefore, exemplary embodiments of the present invention provide a pattern module for an automobile lamp which implements a lamp optical image having various patterns with a three-dimensional effect and a manufacturing method of an optical sheet thereof.

First, a pattern module for an automobile lamp according to an exemplary embodiment of the present invention will be described.

Figure 1:
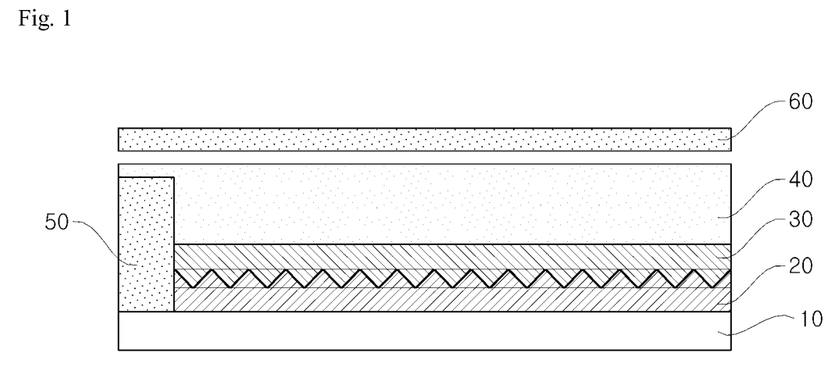
FIG. 1 is a view illustrating a pattern module for an automobile lamp according to an exemplary embodiment of the present invention.

FIG. 1 is a view illustrating a pattern module for an automobile lamp according to an exemplary embodiment of the present invention. Referring to FIG. 1, a pattern module for an automobile lamp according to an exemplary embodiment of the present invention includes a substrate 10, a reflective sheet 20, an optical sheet 30, an optical synthetic resin 40, and a light source 50.

The substrate 10, the reflective sheet 20, the optical sheet 30, and the optical synthetic resin 40 are configured to form layers sequentially from a lower side to an upper portion.

Specifically, the substrate 10 configures a lowest layer. The substrate 10 may be a printed circuit board (PCB). The PCB substrate is a circuit board on which thin copper line is printed to connect semiconductor chips.

The reflective sheet 20 is provided on the substrate 10. The reflective sheet 20 is a sheet which regularly reflects light. In the regular reflection, light which is incident onto a smooth surface such as a mirror is uniformly reflected only in one opposite direction.

The optical sheet 30 is a sheet in which micro pattern optic such as a lenticular lens is processed so as to implement various patterns having a three-dimensional effect. The lenticular lens has an arrangement pattern in which a plurality of semicylindrical lenses is arranged and is an array of lenses to magnify an image seen from slightly different angle. The lenticular lens is disposed in front or back of the display panel to observe pixels in different groups depending on a viewing position to view an image at different points of view. The lenticular lens is formed such that one surface of a plastic sheet which is extrusion-molded is embossed with small wave pattern which is called lenticular and the other surface is processed to be smooth to perform printing thereon. The lenticular method is a method that adds a lenticular in which lots of semicylindrical lenses are vertically attached to a screen and it seems that a minute vertical line is generated in a state when a screen of a projection TV, that is, a protective filter is removed.

The optical synthetic resin 40 may be any one of resin, acryl (PMMA), and silicon. The resin is an amorphous solid or a semisolid which is formed of organic compounds and a derivative thereof and is classified into a natural resin and a synthetic resin (plastic). The latter, that is, the synthetic resin is used for molding or casting. The resin is largely divided into an epoxy resin which is mainly used to manufacture a pattern and a non-forming urethane resin which is mainly used to be poured into a mold for casting.

Polymethylmethacrylate (PMMA) is a polymer which is obtained by polymerizing methyl methacrylate ($CH_2$=C($CH_3$)$COOCH_3$) and is a representative methacrylic resin. The PMMA has excellent transparency and light resistance among the plastic materials and satisfactory mechanical strength and balance of a moldability.

Silicon is silicon resin which is synthesized with silicon as a raw material. Depending on a degree of polymerization, silicon may be formed as silicon oil, silicon rubber, or silicon resin. Silicon oil is frequently used for textile products and has heat resistance, oxidation resistance, resistance against various chemicals, water repellency, and electric insulation property. These properties are applied to process textile products. As a waterproof agent, when the silicon is permeated into textiles and heated, the silicon is strongly coupled to the textiles to show permanent waterproofing property.

A plurality of light sources 50 is disposed on a substrate 10. The light source 50 may be an LED. The light source 50 may be a side view LED. Light, which is emitted from the LED to a side, is totally reflected in an optical synthetic resin 40 which is basically a light guiding material and moves to the side. The LED (light emitting diode) is a semiconductor element which flows current into a compound such as gallium arsenide to emit light. The semiconductor element injects minority carriers (electron or hole) using a p-n junction structure of an m semiconductor and recombines the carriers to emit light. The LED is required to generate tiny light which is flickering when a hard disk is turned in a main body of a computer, a large size electronic display which is provided on a building of a downtown, invisible ray which is generated when a signal is transmitted to a main body of a TV by pressing a remote controller. The LED has a high efficiency for converting electric energy into light energy so that energy may be saved up to 90%. Therefore, the LED attracts an attention as a next generation light source which may be substituted for an incandescent lamp or a fluorescent light whose energy efficiency is just 5%. The LED is configured with a structure in which when current passes through a conductive material with electrodes attached thereon and therebelow, positive charge particles which are called an electron and a hole are combined at a center of the electrodes to emit a photon of light. A color of the light may vary depending on a property of the material.

In the meantime, an upper synthetic resin 60 may be provided above the optical synthetic resin 40. The upper synthetic resin 60 may be a PET. The PET (polyethylene terephthalate) is a synthetic resin which is used to manufacture a bottle of a drink.

The pattern module for an automobile lamp according to the exemplary embodiment of the present invention with the above-described structure may implement a 3D stereoscopic image of a surface light source of an automobile lamp. In the exemplary embodiment of the present invention, the optical sheet 30 has the most core role to implement a 3D stereoscopic image of the surface light source of an automobile lamp.

Figure 2:
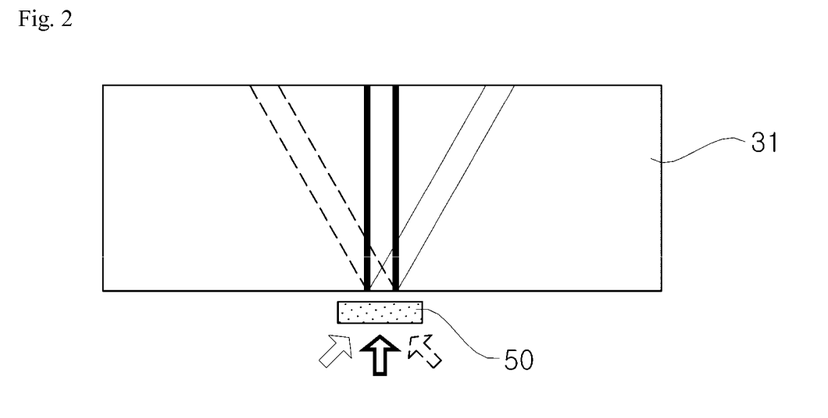
FIG. 2 is a view illustrating scattering of light emitted a light source of a lenticular lens according to an exemplary embodiment of the present invention.

FIG. 2 is a view illustrating scattering of light emitted from a light source of a lenticular lens according to an exemplary embodiment of the present invention. The light emitted from the light source 50 is scattered by the optical sheet 30 which includes the lenticular lens 31. That is, when a module to which the optical sheet 30 including the lenticular lens 31 is applied is seen from a plan view, a line shaped image appears in a normal direction of a direction of the lenticular lens 31. When an observation angle is changed, a position of the line of the observation direction may be moved together with a straight line which extends in an arrow direction of FIG. 2 and a line direction represented by a dotted line.

Figure 3:
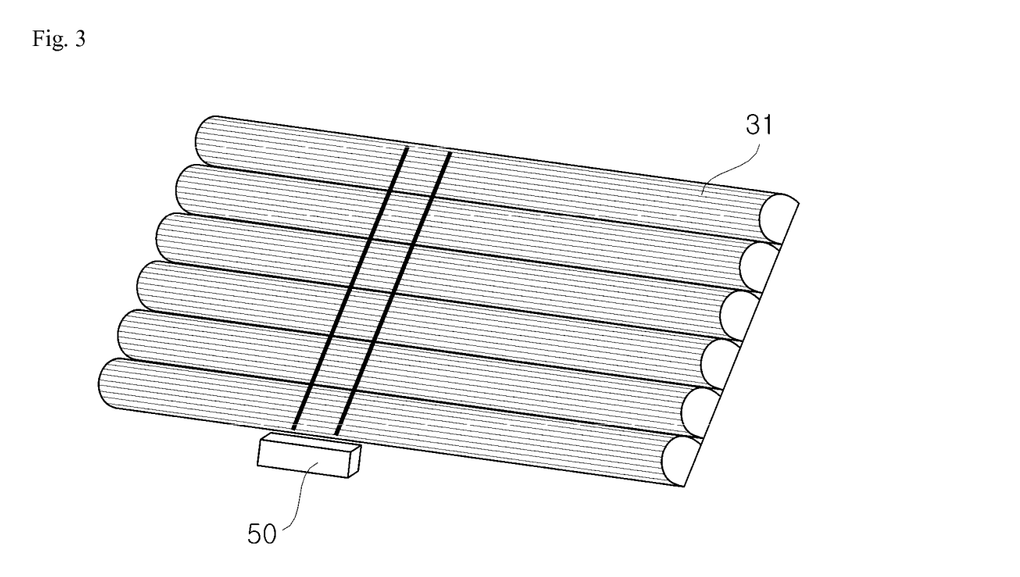
FIG. 3 is a view illustrating a lenticular lens according to an exemplary embodiment of the present invention.
Figure 4:
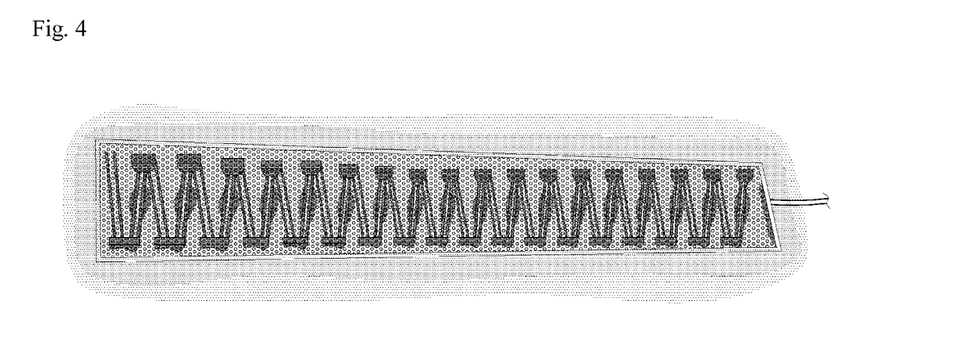
FIG. 4 is a view illustrating a lighted-on image of a lamp by the lenticular lens of FIG. 3.

FIG. 3 is a view illustrating a lenticular lens according to an exemplary embodiment of the present invention and FIG. 4 is a view illustrating a lighted-on image of a lamp by the lenticular lens of FIG. 3. As illustrated in FIG. 3, the lenticular lens 31 may be provided on one surface of the optical sheet 30. Specifically, a size of the lenticular lens 31 is 20 to 50 μm. The lenticular lens 31 may have a shape in which a plurality of column-shaped lenses having any one shape selected from a semicircle, a semi ellipse, and a triangle is arranged.

As illustrated in FIG. 3, the lenticular lens 31 which is formed on the optical sheet 30 may be configured such that lenses which form the lenticular lens 31 are arranged so as to be horizontal with a line on which the plurality of light sources 50 is arranged. A bold line which is represented on the lenticular lens of FIG. 3 indicates an image of light which is emitted from the light source. When the lenticular lens as illustrated in FIG. 3 is used, a lamp light image having a 3D image shape with a straight line pattern as illustrated in FIG. 4 may be implemented.

Figure 5:
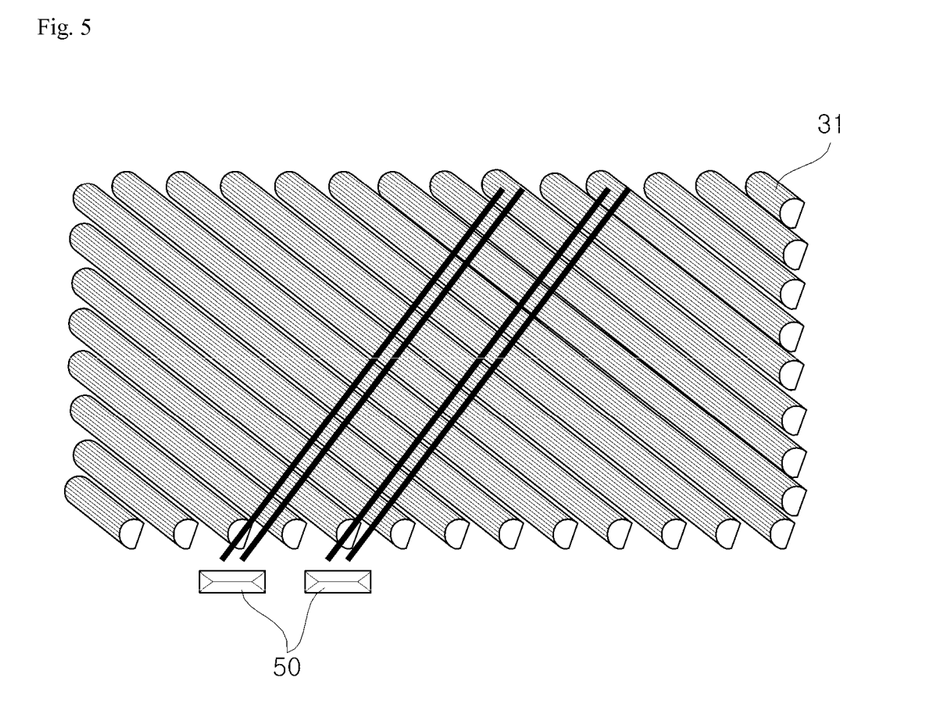
FIG. 5 is a view illustrating a lenticular lens according to an exemplary embodiment of the present invention.
Figure 6:
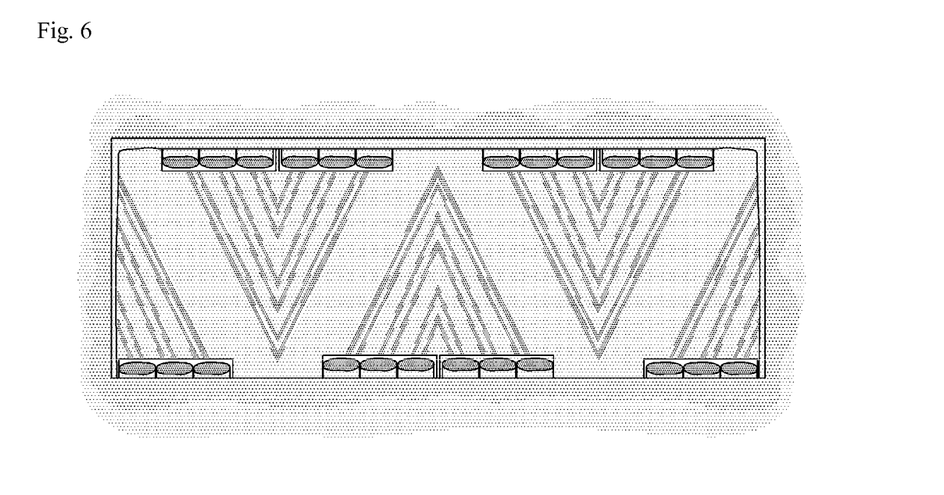
FIG. 6 is a view illustrating a lighted-on image of a lamp by the lenticular lens of FIG. 5.

FIG. 5 is a view illustrating a lenticular lens according to an exemplary embodiment of the present invention and FIG. 6 is a view illustrating a lighted-on image of a lamp by the lenticular lens of FIG. 5. As illustrated in FIG. 5, the lenticular lens 31 which is formed on the optical sheet 30 may be configured such that lenses which form the lenticular lens 31 are arranged so as to be inclined with respect to a line on which the plurality of light sources 50 is arranged. A bold line which is represented on the lenticular lens of FIG. 5 indicates an image of light which is emitted from the light source. When the lenticular lens as illustrated in FIG. 5 is used, a line shaped lamp light image which forms a predetermined angle with the light source 50 may be implemented as illustrated in FIG. 6.

Figure 7:
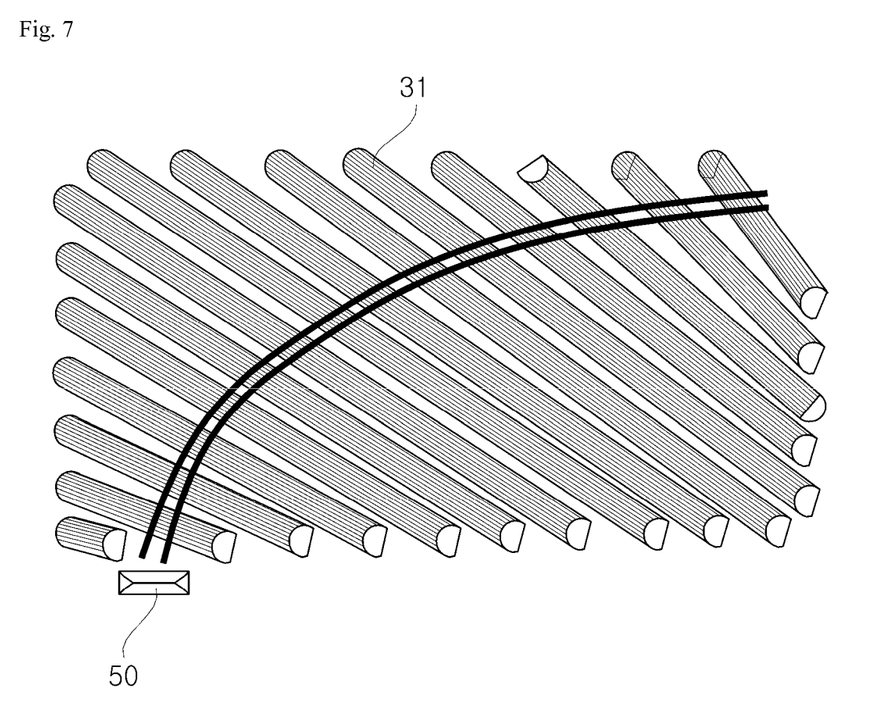
FIG. 7 is a view illustrating a lenticular lens according to an exemplary embodiment of the present invention.
Figure 8:
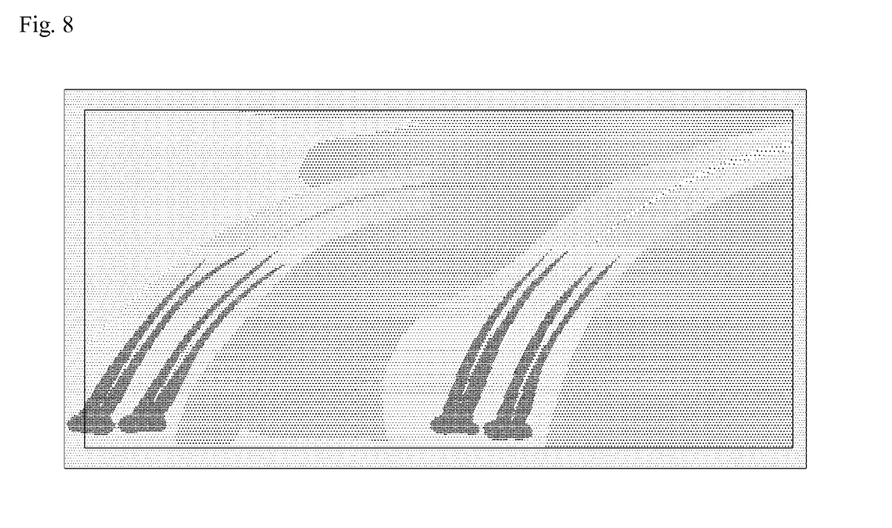
FIG. 8 is a view illustrating a lighted-on image of a lamp by the lenticular lens of FIG. 7.

FIG. 7 is a view illustrating a lenticular lens according to an exemplary embodiment of the present invention and FIG. 8 is a view illustrating a lighted-on image of a lamp by the lenticular lens of FIG. 7. As illustrated in FIG. 7, a lenticular lens 31 which is formed on an optical sheet 30 may be configured such that lenses which configure the lenticular lens 31 are arranged so as to be inclined with respect to a line on which a plurality of light sources 50 is arranged and one ends of both ends of the lenses are arranged with an interval between the lenses. In this case, the other ends of the lenses are arranged so as to meet together. A bold line which is represented on the lenticular lens of FIG. 7 indicates an image of light which is emitted from the light source. When the lenticular lens as illustrated in FIG. 7 is used, a lamp light image having a curve pattern may be implemented as illustrated in FIG. 8.

Next, a manufacturing method of an optical sheet of a pattern module for an automobile lamp according to an exemplary embodiment of the present invention will be described.

The manufacturing method of an optical sheet of a pattern module for an automobile lamp according to an exemplary embodiment of the present invention may be divided into three processes of a pattern forming process for manufacturing an optical sheet 30, a mold manufacturing process, and a sheet manufacturing process.

Figure 9:
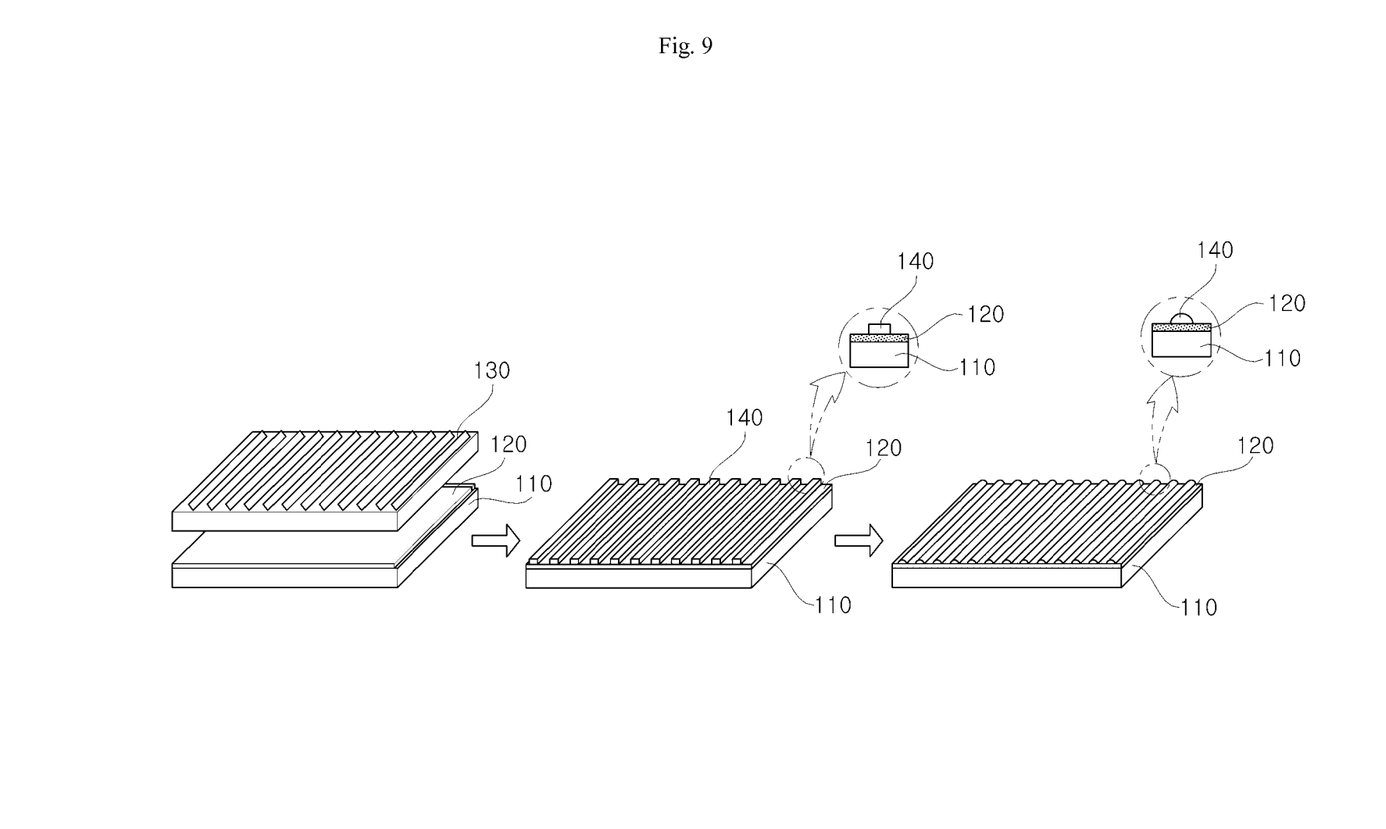
FIG. 9 is a view illustrating a pattern forming process for manufacturing an optical sheet according to an exemplary embodiment of the present invention.

FIG. 9 is a view illustrating a pattern forming process for manufacturing an optical sheet according to an exemplary embodiment of the present invention. The pattern forming process for manufacturing an optical sheet 30 is a pattern forming process using photolithography. The pattern forming process for manufacturing an optical sheet 30 is sequentially performed in accordance with an arrow direction of FIG. 9.

Referring to FIG. 9, the pattern forming process for manufacturing an optical sheet 30 includes a first step of applying an exposure solution 120, a second step of manufacturing a mask 130, a third step of forming an uneven pattern 140 on a surface of a specimen 110, and a fourth step of manufacturing a pattern having a shape of the lenticular lens 31.

Specifically, the first step is a step of applying an exposure solution 120 and the exposure solution 120 is applied with a predetermined thickness so as to form a pattern on the specimen 110. When the exposure solution 120 is exposed to ultraviolet ray, the specimen is etched.

The second step is a step of manufacturing a mask 130 and the mask 130 is manufactured with a lens size. The mask 130 is a frame for forming a shape of the lens. When the mask 130 is disposed on the specimen 110 on which the exposure solution 120 is applied and exposed to the ultraviolet ray, a lens pattern is formed.

The third step is a step of forming an uneven pattern 140 on a surface of the specimen 110 and a portion excluding the mask 130 is etched by a photolithography process. More specifically, in the third step, the mask 130 is disposed above the specimen 110 on which the exposure solution 120 is applied and then exposed to the ultraviolet ray to etch the portion excluding the mask 130. As described above, when the portion excluding the mask 130 is etched by the photolithography process, an uneven micro pattern 140 having a rectangular column shape is formed on the surface of the specimen 110.

The fourth step is a step of manufacturing a pattern having a shape of the lenticular lens 31 and reflow is performed on the specimen 110 on which a pattern having a rectangular column shape is formed. As described above, when heat is applied to the specimen 110 on which the pattern having a rectangular column shape is formed, the pattern having a rectangular column shape is melted and cooled down and the pattern having a rectangular column shape is changed into a semicylindrical shape by stress. As a result, a lenticular lens pattern which is formed by combination of patterns having a semicylindrical shape may be manufactured.

Figure 10:
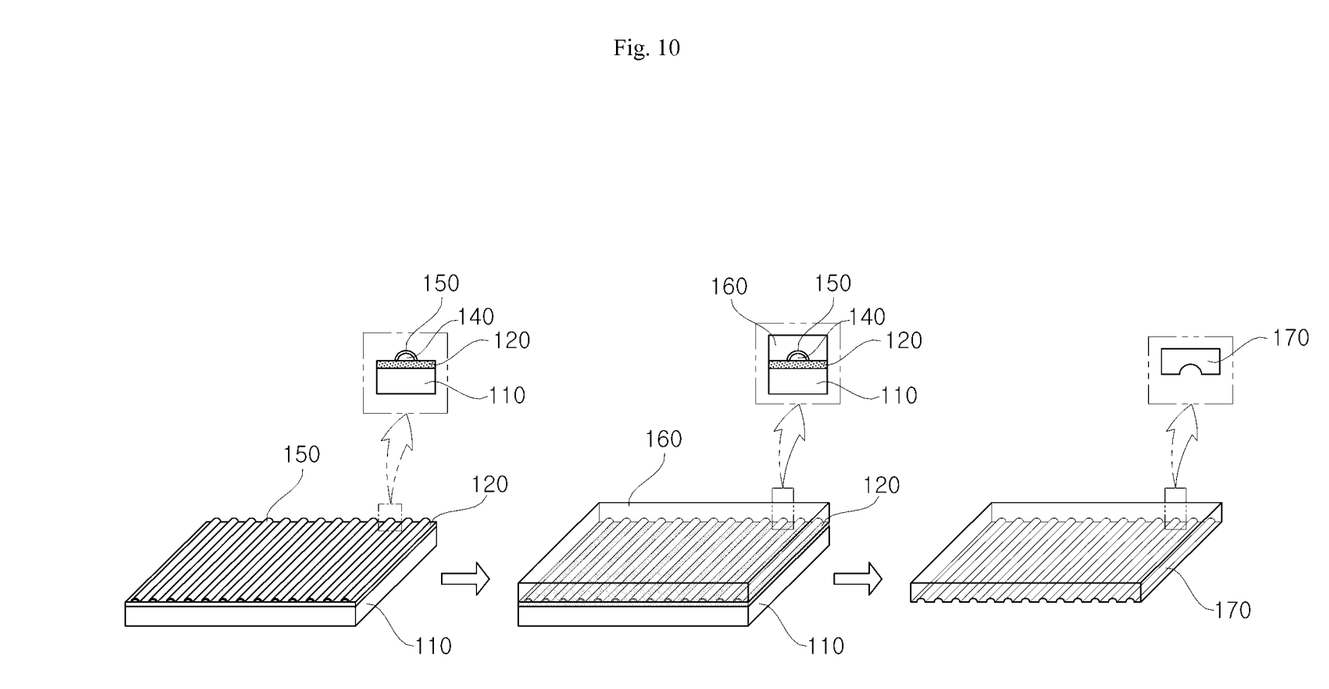
FIG. 10 is a view illustrating a mold manufacturing process for manufacturing an optical sheet according to an exemplary embodiment of the present invention.

FIG. 10 is a view illustrating a mold manufacturing process for manufacturing an optical sheet according to an exemplary embodiment of the present invention. The mold manufacturing process for manufacturing an optical sheet 30 is a process of manufacturing a pattern mold by plating.

The mold manufacturing process for manufacturing an optical sheet 30 is performed after the fourth step and includes a fifth step of depositing copper 150, a sixth step of plating with nickel 160, and a seventh step of manufacturing a lens array. Specifically, the fifth step is a step of depositing copper 150. In the fifth step, copper is primarily deposited on a master product which has a lenticular lens pattern which is manufactured through the fourth step. That is, copper 150 is deposited on the surface of the pattern to form a copper 150 deposition layer.

The sixth step is a step of plating with nickel 160. In the sixth step, the copper 150 deposition layer is plated with nickel (Ni). Nickel is not changed in the air and does not cause oxidation reaction and thus widely is used as a plating material.

The seventh step is a step of manufacturing a lens array. In the seventh step, the pattern is removed to form a lens array 170 which has an inversed shape of the pattern. That is, when the master is removed, a lens array 170 having an inversed shape to a pattern which is designed on a thin nickel plate is formed. The lens array is a mode for molding a lens on a transparent synthetic resin sheet in an eighth step.

Figure 11:
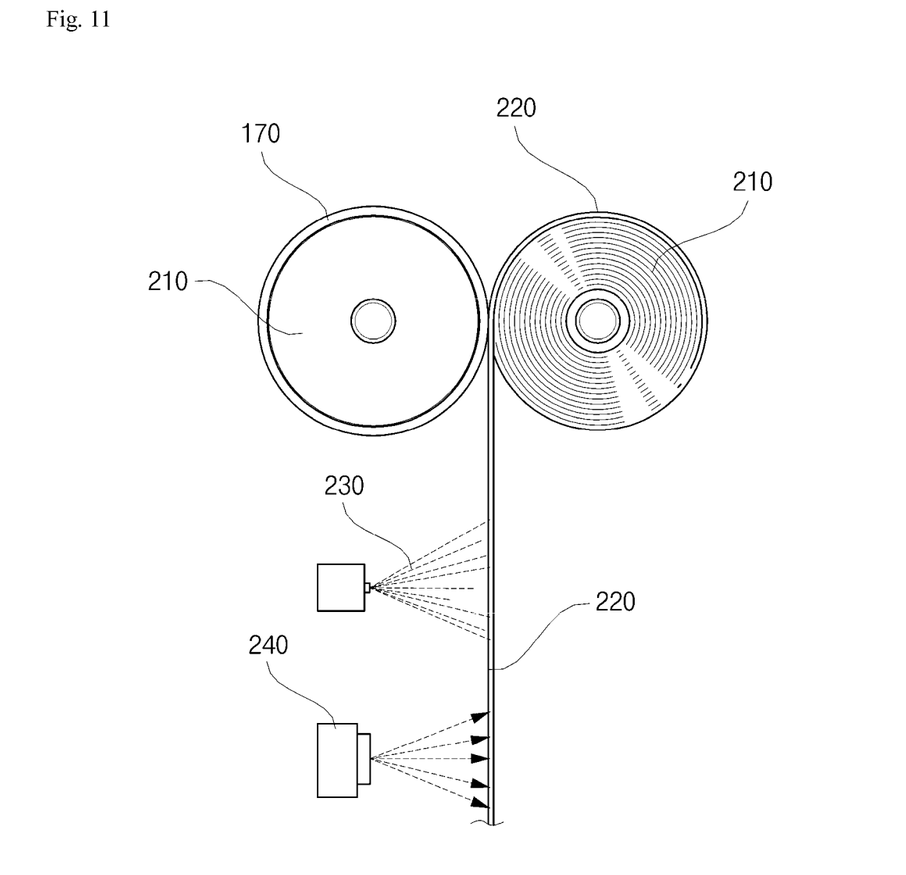
FIG. 11 is a view illustrating an optical sheet manufacturing process according to an exemplary embodiment of the present invention.

FIG. 11 is a view illustrating an optical sheet manufacturing process according to an exemplary embodiment of the present invention. The optical sheet 30 manufacturing process is a process of manufacturing an optical sheet through an imprinting process. The optical sheet 30 manufacturing process is performed after the seventh step and may manufacture an optical sheet 30 which includes a lenticular lens 31.

As illustrated in FIG. 11, an eighth step is a step of manufacturing an optical sheet by mounting the manufactured mold on a roller 210. Specifically, in the eighth step, the mold which is manufactured through the seventh step is mounted on one of rollers 210 which are provided at left and right sides to be opposite to each other. The mold is thin and bendable so as to be attached on a cylindrical surface of the roller 210. A lens forming mold is attached onto the roller 210 such that the lens pattern which is formed on the mold faces the outside of the roller 210 so as to mold the lens pattern on the sheet.

A transparent synthetic resin (PED) sheet is wound on the other roller 210 which is opposite to the roller 210 onto which the mold is attached. In this state, when the both rollers 210 rotate, an optical sheet on which a lens pattern is molded is ejected while the transparent synthetic resin sheet 220 passes between a pair of left and right rollers 210.

When the optical sheet on which a lens pattern is formed is ejected while passing between a pair of left and right rollers 210, ultraviolet resin (UV resin) is applied on the optical sheet by an applicator. The ultraviolet resin 230 which is applied on the optical sheet is cured while passing an ultraviolet lamp (UV lamp) section which is provided below the roller 210. The UV lamp 240 is provided so as to be disposed below the UV resin 230 applicator. The optical sheet 30 including the lenticular lens as illustrated in FIGS. 3, 5, and 7 may be manufactured through the eighth step.

As described above, the manufacturing method of a pattern module optical sheet for an automobile lamp according to the exemplary embodiment of the present invention may implement various lamp light patterns having a three-dimensional effect. Further, a lamp optical image having a 3D image shape with a linear pattern as illustrated in FIG. 4 may be implemented. Further, a line shaped lamp light image which forms a specific angle with a light source as illustrated in FIG. 6 may be implemented. Furthermore, a curved pattern lamp light image as illustrated in FIG. 8 may be implemented.

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit is not limited by the exemplary embodiments and accompanying drawings. The protection scope of the present invention should be interpreted based on the following appended claims and it should be appreciated that all technical spirits included within a range equivalent thereto are included in the protection scope of the present invention.

What is claimed is:

1. A pattern module for an automobile lamp, the pattern module comprising:
   a substrate;
   a reflective sheet which is provided on the substrate and performs regular reflection;
   an optical sheet provided on the reflective sheet, the optical sheet including a plurality of lenticular lenses, the plurality of lenticular lenses respectively having column shapes, axes of the column shapes being perpendicular to cross-sections of the column shapes, a shape of each of the cross-sections being any one of a semicircle, a semi ellipse, and a triangle;
   an optical synthetic resin which is provided on the optical sheet and guides the light; and
   a plurality of light sources for the automobile lamp provided on the substrate, the plurality of light sources being arranged along an arrangement line,
   wherein the axes of the plurality of lenticular lenses are non-perpendicular to the arrangement line of the plurality of light sources.

2. The pattern module of claim 1, wherein the plurality of light sources include an LED.

3. The pattern module of claim 1, wherein the plurality of light sources include a side view LED.

4. The pattern module of claim 1, wherein the optical synthetic resin is any one selected from resin, acryl, and silicon.

5. The pattern module of claim 1, wherein an upper synthetic resin is provided on the optical synthetic resin.

6. The pattern module of claim 5, wherein the upper synthetic resin is a polyethylene terephthalate (PET).

7. The pattern module of claim 1, wherein each of the axes of the plurality of lenticular lenses is parallel to the arrangement line of the plurality of light sources.

8. The pattern module of claim 1, wherein each of the axes of the plurality of lenticular lenses is oblique with respect to the arrangement line of the plurality of the light sources.

9. The pattern module of claim 8, wherein first ends of the plurality of lenticular lenses are spaced apart from each other by a specific interval.

10. The pattern module of claim 9, wherein angles between the axes of the plurality of lenticular lenses and the arrangement line of the plurality of light sources are different from each other.

11. The pattern module of claim 1, wherein the substrate is a printed circuit board (PCB).

\* \* \* \* \*